Feb. 20, 1940.  R. STADLER ET AL  2,191,088
CONTINUOUS PRODUCTION OF POLYMERIZATION PRODUCTS OF ACETYLENE
Filed July 25, 1935
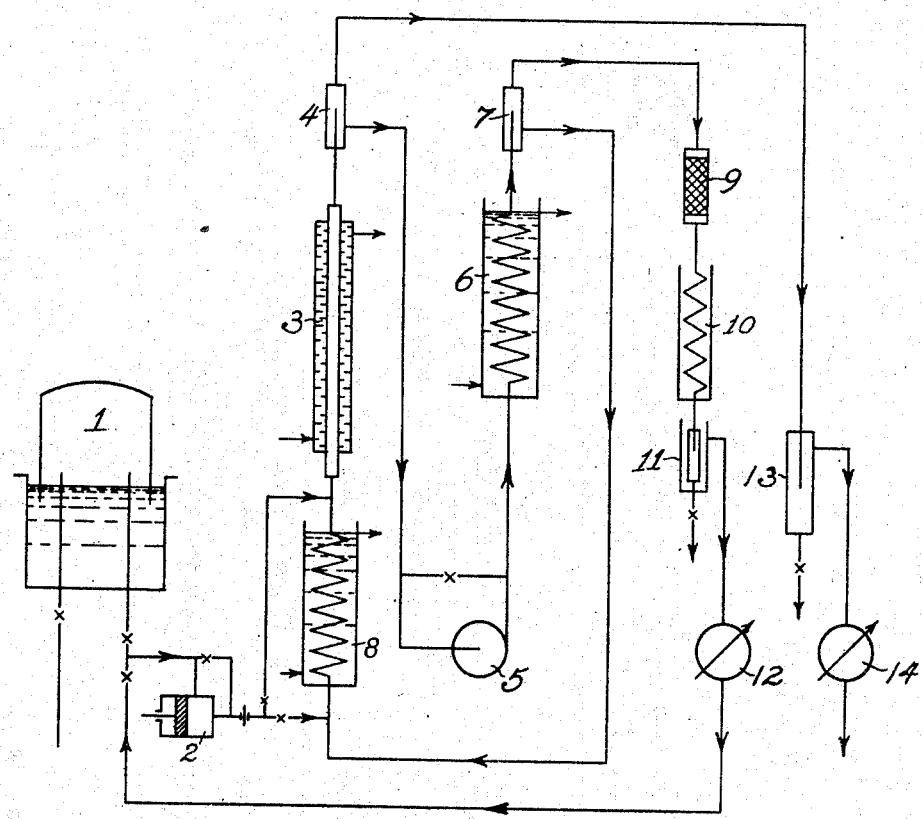
Robert Stadler
Albert Auerhahn
INVENTORS
BY
ATTORNEY Patented Feb. 20, 1940

2,191,088

UNITED STATES PATENT OFFICE 2,191,088

CONTINUOUS PRODUCTION OF POLYMERIZATION PRODUCTS OF ACETYLENE

Robert Stadler and Albert Auerhahn, Heidelberg, Germany, assignors, by mesne assignments, to E. I. du Pont de Nemours & Company Inc., Wilmington, Del.

Application July 25, 1935, Serial No. 33,072
In Germany July 28, 1934

1 Claim. (Cl. 260—678)

The present invention relates to an improved process for the continuous production of polymerization products of acetylene.

In the continuous preparation of polymerization products of acetylene by means of acid cuprous salt solutions containing an ammonium salt or a salt of tertiary amine according to known methods, the acetylene is led through the acid cuprous salt solutions heated to from about 45° to 100° C. at such a speed that the polymerization products of acetylene are removed from the reaction liquid immediately after their formation for the purpose of avoiding undesirable further conversion. The gas leaving the apparatus is then led to a cooling device in which the polymerization products of acetylene are separated. The acetylene which has been mainly unconverted is supplied again to the acid cuprous salt solution.

Dilute acetylene, such as is obtained by the thermal decomposition of hydrocarbons as for example by the treatment of methane or natural gases in the electric arc, cannot be worked up in the said manner because, by reason of the small acetylene partial pressure of the gas mixture, a considerable portion of the acetylene contained in the gas mixture leaves the apparatus unchanged together with the other gases contained in the mixture. Furthermore in order to recover the reaction products obtained in very low concentration when working with such dilute acetylene, much stronger cooling and therefore greater cooling efficiency must be employed than in the case of pure acetylene. In this respect also the usual method of working is of little advantage because it necessitates a far-reaching cooling of the unconverted acetylene.

We have now found that the said objections are overcome by keeping the temperature of the acid cuprous salt solutions treated with acetylene or gases containing the same so low that the gases escaping from these solutions are practically free from polymerization products of acetylene and, when working up gases poor in acetylene, almost free from acetylene itself (1 per cent or less), the cuprous salt solutions being led to a special regenerating plant, in which it is regenerated for example by increasing the temperature or by reducing the pressure or by blowing the cuprous salt solution with gases or vapors such as water vapor, whereupon it is continuously returned into circulation. The said acid cuprous salt solutions may contain an ammonium salt or a salt of a tertiary amine but it is preferable to add to the said solutions, instead of nitrogen bases or their salts, salts of an alkali metal, alkaline earth metal or of a metal of the third group of the periodic system, including the rare earth metals, especially a halide of these metals.

The temperature of the cuprous salt solution to be employed can be readily ascertained by a simple experiment followed by an analysis of the gas leaving the said solution, which gas must be practically free from polymerization products of acetylene. Generally speaking temperatures up to about 40° C. are employed depending on the speed of the acetylene or the gas containing acetylene.

The process according to our present invention, in which pure acetylene may also be employed, will be further described with reference to the accompanying drawing which shows an arrangement of apparatus according to this invention but the invention is not restricted to the particular arrangement shown.

A gas containing about 15 per cent of acetylene, obtained by thermal decomposition of methane in an electric arc, is led from a gas holder 1 by means of a pump 2 into an absorption column 3 in which it is led in the same direction as an acid cuprous salt solution containing about 20 per cent of for example sodium chloride the temperature of which is for example 40° C. The acetylene is absorbed by the cuprous salt solution so that a gas practically free from acetylene leaves the column. This inert gas practically free from acetylene and its polymerization products is separated from the acid cuprous salt solution in a vessel 4. The gas is then led through a gas meter 14; if desired any small amount of polymerization products of acetylene may be separated from the waste gas in an absorption tower 13.

The cuprous salt solution is supplied by means of a pump 5 to a regeneration plant consisting for example of a copper spiral 6, a separating vessel 7 and a cooler 8. The regeneration may be carried out in different ways; it is advantageous to heat the cuprous salt solution in the spiral 6 to such an extent that the polymerization products of acetylene contained in the solution together with the unchanged acetylene escape from the acid cuprous salt solution in the separating vessel 7, the solution then passing to the cooler 8. The mixture of acetylene and polymers thereof leaving the vessel 7 passes through the drying tower 9, the cooler 10 and the separator 11 in which the polymerization products collect in liquid form. The unchanged acetylene passes in the form of a high percentage gas from the separator 11 through the gas meter 12 back into circulation, it being supplied for example to the gas holder 1. The regenerated cuprous salt solution is led from the cooler 8 back to the column 3.

The arrangement which has been described by way of example is capable of great variation. For example the acetylene may be led in counter current to the cuprous salt solution in the column 3 instead of in the same direction; the solution instead of being circulated by means of the pump 5 may also be circulated by the gas stream itself by means of the so-called mammoth pump principle (see "Hütte des Ingenieurs Taschenbuch" 25th edition, 1926, volume II, page 864). Furthermore it is not necessary to heat the cuprous salt solution in the spiral 6 in order to remove the polymerization products of acetylene and the unchanged acetylene from the solution. The regeneration may also be effected by blowing by means of steam or by reduction of pressure.

A further modification of the process which is valuable in practice consists in introducing the acetylene or gas containing acetylene partly or exclusively into the hot cuprous salt solution withdrawn from the separating vessel 7 before it enters the cooler 8, instead of introducing it into the solution in the column 3. When the solution in the spiral 6 is not heated, the regeneration being effected by pressure reduction, the solution is heated after leaving the vessel 7 in this modification of the process. The hot cuprous salt solution entering the cooler 8 absorbs the acetylene with partial polymerization and, because its absorptive power for acetylene is scarcely diminished by the polymerization products, dissolves further amounts of acetylene in the cooler 8 and the cold column 3. In this case also, the gas leaving the column 3 contains only very small amounts of acetylene (1 per cent or less), for example when working up acetylene obtained in the electric arc and containing 15 per cent of acetylene.

The absorption of acetylene may also be increased by increasing the pressure, for example in the column 3.

The process according to this invention renders possible the working up of gases poor in acetylene in an economical manner. The polymerization products of acetylene, without the necessity of cooling the whole of the inert gas, or in the case of working with pure acetylene, unchanged gas, are recovered from the mixture of acetylene and polymerization products set free during the regeneration of the cuprous salt solution by the expenditure of a very small amount of cold. The acetylene still remaining is obtained in a concentrated form and may either be added to the fresh gas or used for other purposes, as for example welding.

The following examples, given with reference to the accompanying drawing, will further illustrate how our said invention may be carried out in practice but the invention is not restricted to these examples.

*Example 1*

115 liters per hour of a gas obtained in the electric arc and containing 14.5 per cent of acetylene are treated in the column 3 with a cuprous salt solution containing 21 per cent by weight of sodium chloride which is kept at about 30° C. The content of acetylene of the gas leaving the separating vessel 4 is 1 per cent. The cuprous salt solution withdrawn from the separating vessel 4 is regenerated in the spiral 6 heated to from about 90° to 95° C., cooled in the cooler 8 and returned in circulation to the column 3. The gas mixture leaving the vessel 7 is split up by cooling. In this way 13.5 cubic centimeters per hour of condensate are obtained which consists mainly of monovinyl acetylene, and a gas containing 65 per cent of acetylene which is returned to the fresh gas.

*Example 2*

Gas obtained in the electric arc and containing 20 per cent of acetylene is treated at the rate of 50 liters per hour in the column 3 in counter current with a cold acid cuprous salt solution containing 25 per cent by weight of barium chloride. 93 per cent of the acetylene is thus absorbed by the cuprous salt solution. The gas mixture obtained by the regeneration of the said solution is cooled and in this way 8.6 cubic centimeters of a condensate are obtained per hour and 4 liters of gas containing 71 per cent of acetylene. The condensate contains about 90 per cent of monovinyl acetylene.

What we claim is:

The process for the continuous preparation of polymerization products of acetylene by means of catalytically acting acid cuprous salt solutions which comprises leading an acetylene gas obtained by the thermal decomposition of hydrocarbons and being poor in acetylene into the cuprous salt solution at such a low temperature that the gas escaping from the said solution is practically free from polymerization products of acetylene and of acetylene itself, continuously withdrawing the cuprous salt solution from the absorption plant and introducing it into a regenerating plant, limiting the reaction period so that the principal polymerization product is monovinyl acetylene, separating from the gas mixture escaping from the regenerating plant the polymerization products obtained, and returning into circulation the cuprous salt solution.

ROBERT STADLER.
ALBERT AUERHAHN.